(12) United States Patent
Schreurs et al.

(10) Patent No.: US 8,014,228 B2
(45) Date of Patent: Sep. 6, 2011

(54) MARINE SEISMIC SOURCES AND METHODS OF USE

(75) Inventors: Jeroen Schreurs, Hvalstad (NO); Simon Flack, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 899 days.

(21) Appl. No.: 11/836,688

(22) Filed: Aug. 9, 2007

(65) Prior Publication Data

US 2009/0040873 A1 Feb. 12, 2009

(51) Int. Cl.
*G01V 1/00* (2006.01)

(52) U.S. Cl. .......................................... 367/16; 181/111

(58) Field of Classification Search ............... 367/15–18, 367/153–154
See application file for complete search history.

(56) References Cited

U.S. PATENT DOCUMENTS

| | | |
|---|---|---|
| 4,721,180 A | 1/1988 | Haughland et al. |
| 6,775,618 B1 | 8/2004 | Robertsson et al. |
| 6,961,284 B2 | 11/2005 | Moldoveanu |
| 2006/0176774 A1 | 8/2006 | Toennessen |
| 2008/0304363 A1* | 12/2008 | Sorli .............................. 367/153 |

OTHER PUBLICATIONS

Smith, "Three-dimensional air gun arrays," *SEG Technical Program Expanded Abstracts*, pp. 282-285, 1984.

* cited by examiner

*Primary Examiner* — Jack Keith
*Assistant Examiner* — Krystine Breier

(57) ABSTRACT

Marine seismic sources and methods of use are described, one source comprising a first set of source arrays and a second set of source arrays, each source array of the first set alternates in cross-line position with source arrays of the second set, each source member of the first set hangs from a hang plate having a first length, and each source member of the second set hangs from a hang plate having a second length, wherein the first length is sufficiently longer than the second length such that downward traveling acoustic pulses emanating from source members in the first set are substantially deghosted by acoustic pulses emanating from corresponding source members of the second set.

18 Claims, 4 Drawing Sheets

MARINE SEISMIC SOURCES AND METHODS OF USE

BACKGROUND OF THE INVENTION

1. Field of Invention

The present invention relates to the field of marine seismic surveying. More specifically, the invention relates to marine seismic sources and methods of improving seismic images obtained using same.

2. Related Art

Marine seismic exploration investigates and maps the structure and character of subsurface geological formations underlying a body of water. For large survey areas, seismic vessels tow one or more marine seismic sources and multiple seismic streamer cables through the water. The seismic sources typically comprise compressed air guns (or other types of source) for generating acoustic pulses in the water. Some of the energy from these pulses propagates downwardly into the geological formations and is reflected upwardly from the interfaces between subsurface geological formations. This reflected energy, along with ghost signals from other surfaces, are sensed with hydrophones attached to the seismic streamers, and data representing such energy is recorded and processed to provide information about the underlying geological features. Ghosting may be reduced by controlling position and timing of the sources, and/or by controlling position of streamers. The streamers may be positioned using steerable birds, deflectors, steerable buoys, and the like.

Previous attempts have not provided optimal de-ghosting of marine seismic images. While these techniques are improvements in the art, further improvement is desired.

SUMMARY OF THE INVENTION

In accordance with the present invention, systems and methods are described for towing shallow and deep source arrays in the same in-line position but at different depths, allowing firing of all of the source members of the shallow and deep source arrays at substantially the same time, except for a slight time delay in firing of the source members of the deep source arrays to align the down-going acoustic waves to take into consideration the depth difference. Systems and methods of the invention reduce or overcome problems with previous systems and methods in de-ghosting data. Systems and methods of the invention may be used to collect data reduced in ghost signals, or that may be de-ghosted in real time or at a later time.

Marine seismic sources of the invention comprise source arrays, sometimes referred to herein as gun-arrays, the source arrays comprising one or more source members, sometimes referred to herein as air-guns. As used herein the term "source array" is meant to be broader than the term gun-array, which those skilled in the art will recognize as meaning one or more air-guns. The term "source member" is meant to be broader than the term air-gun, and is meant to include all acoustic signal-generating devices, including, but not limited to, air-guns, oscillating members, vibration members, explosive charges, percussion devices, and the like. Thus, in the same way that a gun-array includes one or more air-guns, a source array comprises one or more source members. The terms gun-array, gun-string and sub-array are also often used interchangeably in the art to call out an assembly of components, including an array of air-guns, one or more floats, chains, hang plates, everything required to position the gun-array and have it functioning. The term source array will be used herein for this assembly. Finally, the terms "source", "seismic source", and "marine seismic source" are used interchangeably herein, unless a specific embodiment requires a different meaning, and means one or more source arrays comprising some or all source members (e.g., air-guns) fired at substantially the same time as described herein.

A first aspect of the invention is a marine seismic source comprising:
  a first set of source arrays and a second set of source arrays,
    the first and second sets in the same in-line position,
    each source array of the first set alternates in cross-line position with source arrays of the second set,
    each source member of the first set hangs from a hang plate having a first length, and each source member of the second set hangs from a hang plate having a second length,
    wherein the first length is sufficiently longer than the second length such that downward traveling acoustic pulses emanating from source members in the first set are substantially deghosted by acoustic pulses emanating from corresponding source members of the second set.

It will be understood that certain embodiments, as viewed looking from bow to stern in the in-line direction (direction of tow), the first and second sets of source arrays will appear to be in "V", a zig-zag, or connected "W" arrangement, as explain herein, depending upon how many source arrays are in the inventive marine seismic source. A marine seismic source of the invention may comprise a minimum of two source arrays, with a maximum of perhaps fifteen, more typically from three to seven source arrays. All of these may be referred to herein as "modified over/under" arrangements for short-hand, it being understood that corresponding source members in the first and second sets do not form a z-axis. The source arrays in the shallow set are towed at substantially the same shallow depth, while the source arrays in the deeper set are towed at substantially the same deeper depth. This is accomplished through the use of a longer, non-standard hang plate for the first set of source arrays. It will also be understood that certain embodiments may have one or more source array that are not positioned in one of these arrangements, and in certain embodiments, there may be dual marine seismic sources, wherein the source array may or may not be arranged identically in each of the two sources. In other words, one or more source arrays may be positioned laterally away from the over/under source arrays in the cross-line (y) direction or inline (tow, or (x)) direction. The source members in both first and second sets of source arrays may be remotely controlled. The source members in the first and second sets of source arrays may or may not be equally spaced in the inline (x) direction. The source arrays also may or may not be equally spaced in the cross-line direction.

One or more of the source arrays may comprise an adjustment mechanism to control their angle of attack, for example using large or small aspect ratio steering members, and/or bridles, as described in assignee's co-pending published application number 20060176774, published Aug. 10, 2006, incorporated herein by reference, wherein the adjustment mechanism may be connected to a source array and its tow member, the adjustment mechanism adapted to actively manipulate an angle of attack of the source array. As used herein, "actively manipulate" means controlling the angle of attack either directly or indirectly in response to, and/or in anticipation of, an undesirable change in movement of the source array. "Controlling" may be performed locally on the source array, or remotely through any type of communication system. "Angle of attack" means, when referring to a seismic source array, the angle that the body of the source array makes relative to the direction of flow of water past it, sometimes referred to as the flow vector. This may also be described as the angle that the body of the source array makes relative to its direction of travel through the water. The flow vector may or may not be parallel to the tow member.

Another aspect of the invention comprises methods of use of a marine seismic source within the invention in receiver-side de-ghosting of marine seismic images, one method comprising:

(a) towing a marine seismic source of the invention;
(b) initiating all of the source members of the second (shallow) set of source arrays at a first time, resulting in a first set of acoustic signals;
(c) initiating all of the source members of the first (deeper) set of source arrays at a second time using a time delay dictated by the length of the hang plates of the first set of source arrays and local velocity of sound through the water, resulting in a second set of acoustic signals; and
(d) de-ghosting of the first set of acoustic signals with the second set of acoustic signals.

Methods of the invention are not limited in the number of source arrays towed, except for the towing capacity of the tow vessel and personnel deploying and retrieving the source arrays. Nor is there any limit to the number of source members on any source array, or length of the hang plates of the first set of source arrays, although the local sound velocity in the water may vary slightly more in embodiments wherein longer hang plates are employed, and the weight of towing will increase, adding to the expense of the survey. One or more source arrays may be controlled to be laterally spaced in the cross-line direction away from source arrays being towed in over/under configuration. Methods of the invention may comprise wherein steering and firing are performed by communicating with the source arrays, for example using telemetry selected from hard wire, wireless, and optical telemetry. Other methods of the invention comprise adjusting one or more adjustment mechanisms to move one or more source arrays, or the entire seismic source, to a desired position, which may be any direction in 3-dimensions, for example lateral (horizontal), vertical, or any direction in between these extremes. The desired position may be relative to a tow vessel, another source, one or more marine seismic streamers, or to a natural reference such as the water surface, water bottom, or a geologic feature, or a man-made reference, such as a buoy, vessel, drilling rig, production rig, or the like.

Systems and methods of the invention will become more apparent upon review of the brief description of the drawings, the detailed description of the invention, and the claims which follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not necessarily to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

Figure 1:
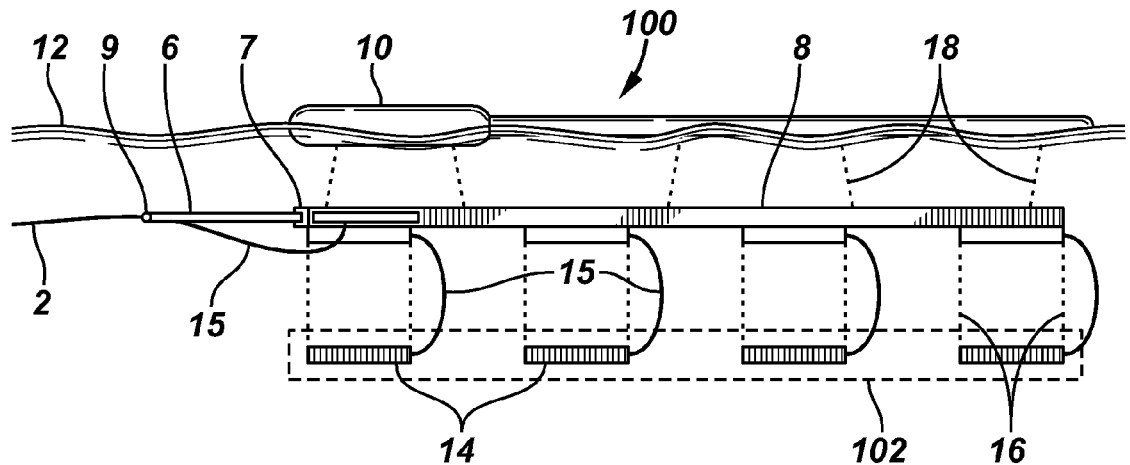
FIG. 1 illustrates in side elevation a prior art source array, one or more of which are useful in forming a "shallow" seismic source.

FIG. 1 illustrates a side-elevation view of a prior art source array 100. (The same numerals are used throughout the drawing figures for the same parts unless otherwise indicated.) Source array 100 comprises a plurality 102 of source members 14, for example compressed air guns, which are fired to generate acoustic waves that are reflected from, among others things, subsurface geological features back to receivers in a streamer (not shown) during a seismic survey. Source members 14 may be other acoustic-wave generation device, such as explosives, percussion devices, and the like. Source array 100 is towed after a seismic vessel (not illustrated) with a strength-taking umbilical 2. Source members 14 may be suspended from chains or other means 16 beneath a plate, beam or similar member 8, typically referred to as a hang plate, that is rigid in at least the lateral plane. Hang plate 8 is in turn suspended from chains or other means 18 beneath a float 10, or alternatively fixed tightly to float 10. Float 10 may be flexible, semi-flexible or rigid, and rides near water surface 12. Optionally, a rigid body such as a solid cylindrical rod 6 may be fixed to member 8 by a swivel connection 7, which may be a hinge, ball joint, or other type of equivalent function joint. The tension from strength-taking umbilical 2 is transferred into a moment on member 8 that causes source array 100 to position itself with an angle of attack with respect to the water flow. This positioning, and change of position if an optional adjustment mechanism is provided, causes source array 100 to position or re-position itself, typically laterally, although other movements are possible.

Figure 2:
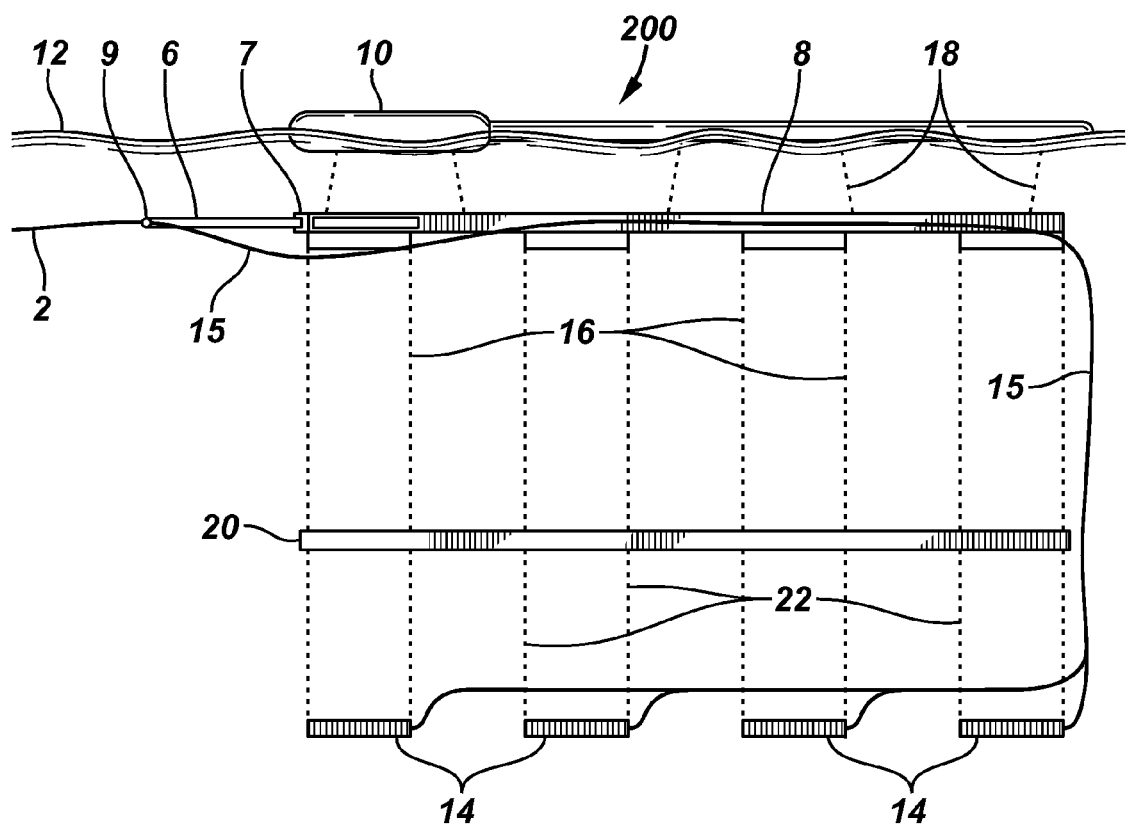
FIG. 2 illustrates in side elevation the source array of FIG. 1 modified to provide long hang plates, one or more of the modified source arrays being useful in forming a "deep" seismic source.

FIG. 2 illustrates a source array 200 in side elevation. Source array 200 is essentially the source array of FIG. 1 modified in accordance with the invention to provide an additional, or "dummy" hang plate 20, one or more of the modified source arrays being useful in forming a "deep" seismic source. Both air and signal may be routed as depicted at 15 along the original hang plate 8 to the stem, and then down to the source members 14. Additional chains or other means 22 are also provided to suspend source members 14 from dummy hang plate 22.

Figure 3A:
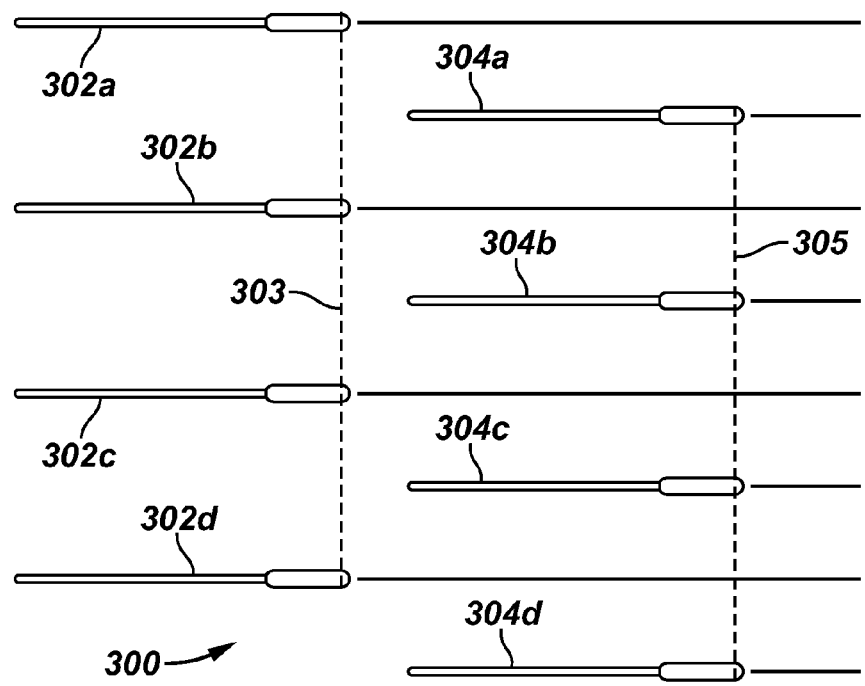
FIGS. 3A-C illustrate schematic plan, side, and front views, respectively of a prior art seismic source able to provide shallow and deep source effects.
Figure 3B:
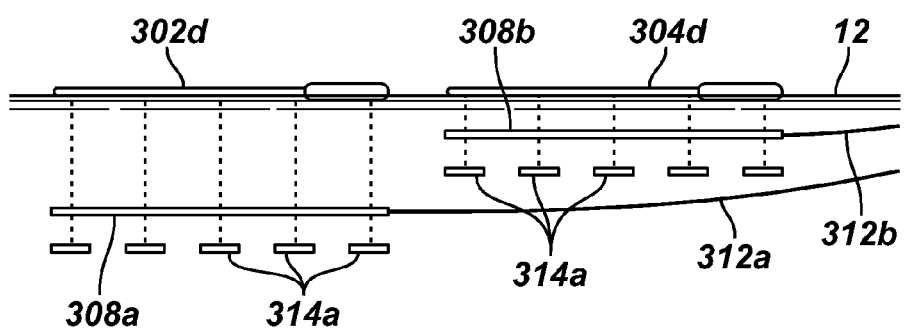
Figure 3C:
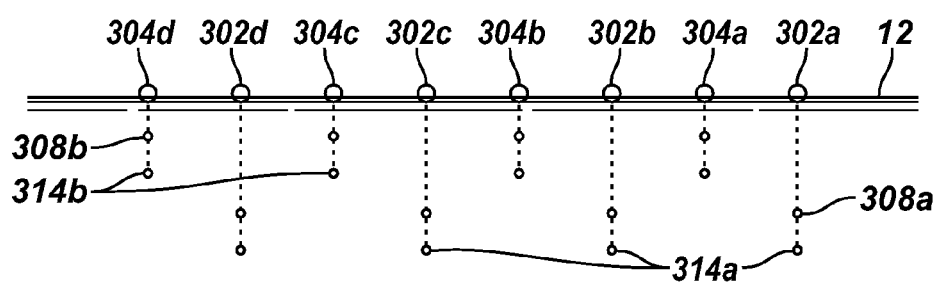

FIGS. 3A-C illustrate schematic plan, side, and front views, respectively of a prior art seismic source embodiment 300 able to provide shallow and deep source effects. This is currently used in the field as an over/under source configuration. A first set of source arrays 302a, 302b, 302c, and 302d are towed at an inline position 303 by respective umbilicals 312 attached to hang plates 308 (only one umbilical 312a, one hang plate 308a, and one group of deep source members 314a viewable in FIG. 3B). Another set of source arrays 304a, 304b, 304c, and 304d are towed at a second inline position 305 by respective umbilicals 312 attached to hang plates 308 (only one umbilical 312b, one hang plate 308b, and one group of shallow source members 314b are viewable in FIG. 3B). Since it is not possible with this system to mount the source members directly above each other they are towed in an "inline staggered W" configuration as illustrated, i.e. every second source array is towed deep with the shallow sources towed with an inline displacement compared to the deep source arrays.

Figure 4A:
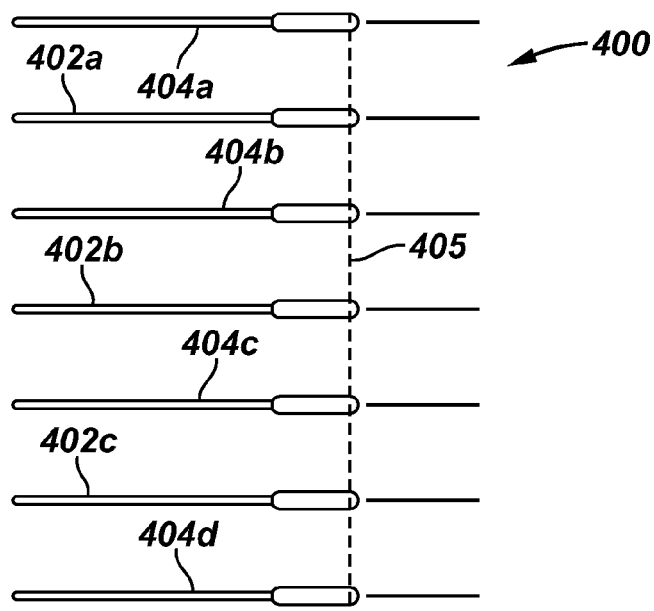
FIGS. 4A-C illustrate schematic plan, side, and front views, respectively, of a marine seismic source in accordance with the invention.
Figure 4B:
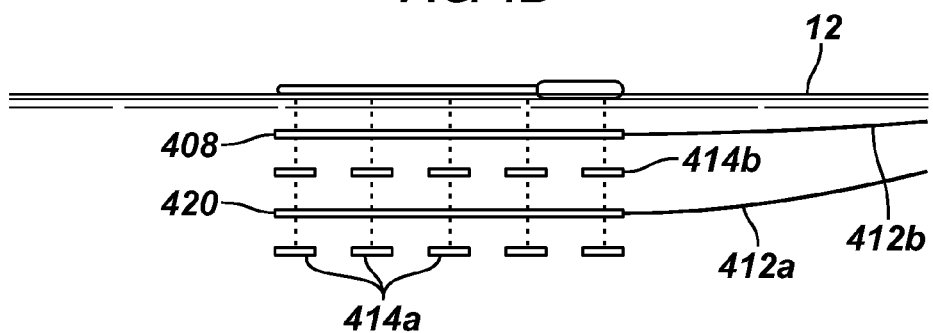
Figure 4C:
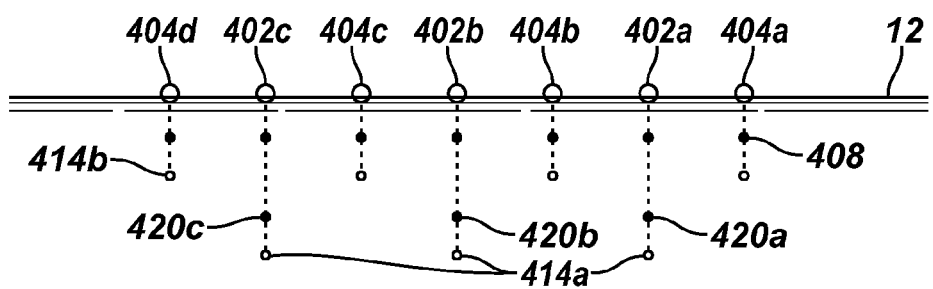

FIGS. 4A-C illustrate schematic plan, side, and front views, respectively of a marine seismic source in accordance with the invention 400 able to provide shallow and deep source effects. This is one embodiment of the new towing configuration that will be made possible with a "dummy hang plate layer." As illustrated in FIG. 4A, in embodiment 400 the shallow and deep sources arrays are aligned in the inline direction as indicated by line 405. A first, shallow source array is represented by four floats 404a, 404b, 404c, and 404d, and their respective hang plates 408 and four source members 414b, while a deeper source array is illustrated by three floats 402a, 402b, and 402c and their respective standard hang plates 408, dummy hang plates 420a, 420b, and 420c, and three source members 414a. The first set of source arrays are towed by respective umbilicals 412b, while the second set of source arrays are towed by respective umbilicals 412a. The configuration of source members 414a and 414b is considered a true "W" configuration, in other words alternating source arrays are towed deep and shallow at the same inline position 405. With this and other configurations as illustrated in FIGS. 5 and 6, an operator may fire both deep and shallow source members at essentially the same point in time, only with a small time shift to align the down-going waves (as would be performed for a "true" over under source).

Figure 5:
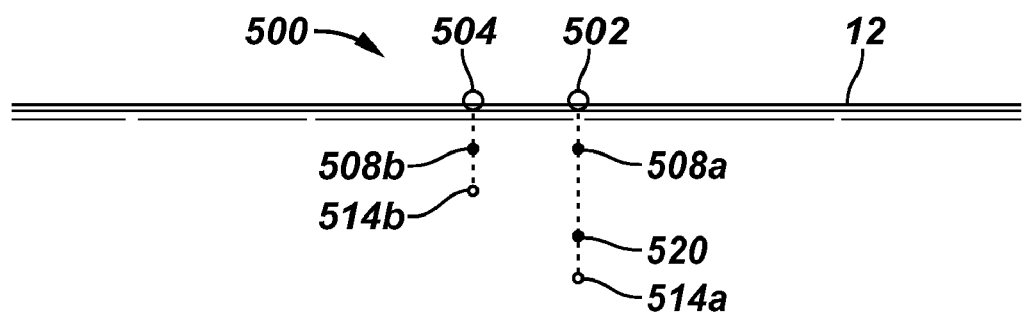
FIGS. 5 and 6 illustrate schematic front views of two other embodiments of seismic sources in accordance with the invention.
Figure 6:
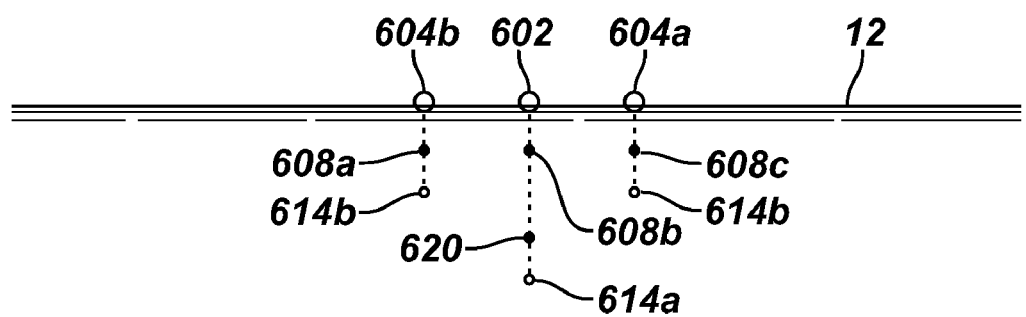

FIGS. 5 and 6 illustrate frontal views of two alternative embodiments 500 and 600 within the invention. Embodiment 500 includes only two source arrays, illustrated as comprising float 504, hang plate 508b, and shallow source members 514b, as well as float 502, standard hang plate 508a, dummy hang plate 520, and deep source members 514a. Embodiment 600 includes floats 604a and 604b, hang plates 608a and 608c, and shallow source members 614b, as well as float 602, standard hang plate 608b, dummy hang plate 620, and one set of deep source members 614a. In each of embodiments 500 and 600 the shallow and deep source arrays may each comprise a plurality of source members in the inline direction.

Advantages of marine seismic sources of the invention include the fact that, since it is desired to fire the deep and shallow source members at the same point in space, the deep and shallow source arrays in the current (prior art) configuration illustrated in FIGS. 3A-C are shot in "flip-flop" mode (i.e. deep string firing when it comes to the point in space where the shallow string was fired). With embodiments of the invention, an operator may fire both deep and shallow sources at essentially the same time (except for a short time delay to align down-going waves), which has the advantages of reducing the source effort required, in certain embodiments by one half; and reducing perturbation errors.

One or more, or all of hang plates 408, 508, and 608 may, in certain embodiments, be replaced with an optional plate or hydrofoil-shaped body having a higher aspect ratio (ratio between height and length) that may result in better deflection performance, as described in assignee's published US patent application number 20060176774 A1, published Aug. 10, 2006, incorporated herein by reference. Such an adjustment mechanism may be connected to the source array and source tow member, the adjustment mechanism adapted to actively manipulate an angle of attack of the source array. As used herein, "actively manipulate" means controlling the angle of attack either directly or indirectly in response to, and/or in anticipation of, an undesirable change in movement of the source array. "Controlling" may be performed locally on the source array, or remotely through any type of communication system. "Angle of attack" means, when referring to a seismic source array, the angle that the body of the source array makes relative to the direction of flow of water past it, sometimes referred to as the flow vector. This may also be described as the angle that the body of the source array makes relative to its direction of travel through the water. The flow vector may or may not be parallel to the tow member.

The optional adjustment mechanism may be connected to either the shallow, the deep, or both source arrays at one or a plurality of tow points located on the source array, and may include a towing harness. The tow point may be located at a front end of the source array, or at a position between the front end of the source array and a rear end of the source array. The adjustment mechanism may comprise a deflecting member positioned between the float and one or more of the source members, and may further comprise a rigid moment-transfer member having first and second portions, which may or may not be ends, the first portion connected to the source tow member, the second portion connected to a tow point on the deflecting member through a swivel joint, where the swivel joint may be a hinged joint, ball joint, or equivalent function joint. The adjustment mechanism may further comprise an actuator mounted on the deflecting member near the tow point and adapted to actuate the rigid moment-transfer member.

The adjustment mechanism may comprise either a low or high aspect ratio deflecting member positioned between, or in front of a float and one or more source members. In this arrangement, the adjustment mechanism may include a bridle system, and a rotatable connector may be operatively connected to the deflecting member and adapted to function with the bridle system. The rotatable connector may be positioned on the deflecting member approximately at a mid-section of the deflecting member. A local controller may be mounted on the apparatus, the local controller adapted to receive a signal from an on-board controller on a tow vessel or other remote controller and send a signal to the local controller, which then operates an actuator and rotatable connector. The bridle system may comprise a front bridle leg attached to a front end of the deflecting member, and an aft bridle leg comprising a loop that passes through the rotatable connector, and thus the bridle system may be remotely controllable. The bridle system may include a frame that is connected to a front end of the deflecting member via a swivel joint and adapted to pivot about the swivel joint, and the frame may attach to an aft bridle leg comprising a loop that passes through the rotatable connector. The frame may be a triangular frame, or any other shaped frame that performs the equivalent function of moving the bridle legs when actuated. Another alternative is to replace all or substantial portions of the bridle legs with linear actuators. In this latter embodiment, the adjustment mechanism may be a combination of a frame, linear actuators, and a high aspect ratio deflecting member, as further explained herein.

As used herein the phrases "over/under configuration" and "over/under configured" means, when viewing a cross-section of the source geometry in a vertical plane, a source array is above and/or below one or more other source arrays, but not in a vertical axis. The resulting configuration is a "V", zig-zag, or "W" configuration, viewing the source from the front.

The term "control", used as a transitive verb, means to verify or regulate by comparing with a standard or desired value, and when used as a noun ("controller") means a mechanism that controls. Control may be open-loop, closed loop, feedback, feed-forward, cascade, adaptive, heuristic and combinations thereof.

The term "adjusting" means changing one or more parameters or characteristics in real-time or near-real-time. "Real-time" means dataflow that occurs without any delay added beyond the minimum required for generation of the dataflow components. It implies that there is no major time gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after they are received by the next process in the decision line.

Over/under configuration towing and firing of marine seismic sources may improve the seismic image considerably as one may be able to separate the downward propagating acoustic wave field from the upward propagating wave field. Among geophysicists this is called de-ghosting. FIGS. 4, 5 and 6 illustrate certain sources and towing arrangements employing sources of the invention. Many variations are possible, and it should be emphasized again that the systems and methods of the invention are not limited to the specific embodiments illustrated and discussed herein.

It is within the invention to combine systems of the invention with other position control equipment, such as source array deflecting members, and streamer deflectors. Some of these may include bridle systems, pneumatic systems, hydraulic systems, and combinations thereof.

Materials of construction of source arrays, including the standard and dummy hang plates useful in the invention, may vary. There may be a need to balance the seismic equipment so that the marine seismic source is balanced to be neutrally buoyant in the water, or nearly so, to perform its intended function. Polymeric composites, with appropriate fillers used to adjust buoyancy and mechanical properties as desired, may be employed. Hang plates are typically metallic members of certain weight in order to ensure that the source members are suspended at the desired depths.

In use the position of the source arrays may be actively controlled by GPS or other position detector sensing the position of the source arrays, and tilt sensors, acoustic sensors, or other means may sense the orientation and angle of attack of one or more individual source members and feed this data to navigation and control systems. The positions of GPS nodes could be measured while the source array shape may be calculated using a simulation and optionally current direction and magnitude measurements. Or all source array positions could be determined by simulation only. Alternatively, data may be fed-forward to local controllers on one, some, or all adjustment mechanisms on the source arrays, if present. Gross positioning and local movement of the source array sets may be controlled on board a tow vessel, on some other vessel, locally, or indeed a remote location. By using a communication system, either hardwire or wireless, information from the remote controller may be sent to one or more local controllers on the source arrays when present and when desired. The local controllers in turn may be operatively connected to adjustment mechanisms comprising motors or other motive power means, and actuators and couplers connected to the source arrays which function to move the adjustment mechanisms as desired. This in turn may adjust the position of the source array, causing it to move as desired. Feedback control may be achieved using local sensors positioned as appropriate depending on the specific embodiment used, which may inform the local and remote controllers of the position of one or more source arrays, distance between source arrays, a position of an actuator, the status of a motor or hydraulic cylinder, the status of an adjustment mechanism, and the like. A computer or human operator can thus access information and control the entire seismic source, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A marine seismic source comprising:
    a first set of source arrays and a second set of source arrays, the first and second sets in the same in-line position,
    each source array of the first set alternates in cross-line position with source arrays of the second set,
    each source member of the first set hanging from a standard hang plate and a dummy hang plate having a first length, and each source member of the second set hangs from a hang plate having a second length,
    wherein the first length is sufficiently longer than the second length such that downward traveling acoustic pulses emanating from source members in the first set are substantially deghosted by acoustic pulses emanating from corresponding source members of the second set.

2. The marine seismic source of claim 1 wherein, as viewed looking from bow to stern in the in-line direction, the first and second sets of source arrays are arranged in a configuration selected from "V", zig-zag, and connected "W", depending upon how many source arrays are in the marine seismic source.

3. The marine seismic source of claim 1 comprising from two source arrays to fifteen source arrays.

4. The marine seismic source of claim 1 comprising from three source arrays to seven source arrays.

5. The marine seismic source of claim 1 wherein the source members in the first and second sets of source arrays are equally spaced in the inline (x) direction.

6. The marine seismic source of claim 1 wherein the source arrays are equally spaced in the cross-line (y) direction.

7. The marine seismic source of claim 6 wherein the source members in both first and second sets of source arrays are remotely controlled.

8. The marine seismic source of claim 2 comprising one or more other marine seismic sources comprising source arrays that are arranged differently than the first and second sets of source arrays.

9. The marine seismic source of claim 1 comprising dual marine seismic sources, wherein a second marine seismic source is arranged identically in each of the two sources.

10. The marine seismic source of claim 1 wherein one or more of the source arrays comprises an adjustment mechanism to actively manipulate the source array's angle of attack.

11. The marine seismic source of claim 10 wherein the adjustment mechanism is selected from large aspect ratio steering members, small aspect ratio steering members, bridles, and combinations thereof.

12. The marine seismic source of claim 1 including one or more features selected from:
a) a control system allowing each source array to send signals to and receive signals from each other source array;
b) a control system allowing each source array to send signals to and receive signals from a remote controller;
c) a third set of source arrays having source members positioned at a vertical position different from the source members of the first and second sets;
d) a fourth set of source arrays having source members positioned a horizontal offset ranging from zero to some non-zero value with respect to the first and second sets;
e) and combinations thereof.

13. A marine seismic source comprising:
from three to seven source arrays arranged in a first set of source arrays and a second set of source arrays, the first and second sets of source arrays arranged in a "W" configuration as viewed looking from bow to stern in the in-line direction;
each source array of the first set alternates in cross-line position with source arrays of the second set,
each source member of the first set hangs from a standard hang plate and a dummy hang plate having a first length, and each source member of the second set hangs from a hang plate having a second length,
wherein the first length is sufficiently longer than the second length such that downward traveling acoustic pulses emanating from source members in the first set are substantially deghosted by acoustic pulses emanating from corresponding source members of the second set.

14. The marine seismic source of claim 13 wherein the source members in the first and second sets of source arrays are equally spaced in the inline (x) direction.

15. The marine seismic source of claim 13 wherein the source arrays are equally spaced in the cross-line direction.

16. The marine seismic source of claim 13 wherein the source members in both first and second sets of source arrays are remotely controlled.

17. The marine seismic source of claim 13 comprising dual marine seismic sources, wherein a second marine seismic source is arranged identically in each of the two sources.

18. The marine seismic source of claim 13 wherein the one or more of the source arrays comprises an adjustment mechanism to actively manipulate the source array's angle of attack.

* * * * *